(12) United States Patent
Eriksen et al.

(10) Patent No.: US 11,313,246 B2
(45) Date of Patent: Apr. 26, 2022

(54) GAS TURBINE ENGINE WASH SYSTEM

(71) Applicant: General Electric Company, Schenectady, NY (US)

(72) Inventors: Michael Edward Eriksen, Cincinnati, OH (US); Ethan Patrick O'Connor, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 418 days.

(21) Appl. No.: 15/365,070

(22) Filed: Nov. 30, 2016

(65) Prior Publication Data

US 2018/0149038 A1 May 31, 2018

(51) Int. Cl.
| | |
|---|---|
| *B08B 3/00* | (2006.01) |
| *F01D 25/00* | (2006.01) |
| *F01D 25/34* | (2006.01) |
| *F01D 25/36* | (2006.01) |
| *F01D 15/06* | (2006.01) |
| *F02C 7/32* | (2006.01) |
| *B08B 9/00* | (2006.01) |
| *F04D 29/70* | (2006.01) |

(52) U.S. Cl.
CPC ............ *F01D 25/002* (2013.01); *B08B 3/003* (2013.01); *B08B 9/00* (2013.01); *F01D 15/06* (2013.01); *F01D 25/34* (2013.01); *F01D 25/36* (2013.01); *F02C 7/32* (2013.01); *F04D 29/705* (2013.01); *F05D 2220/32* (2013.01); *F05D 2260/406* (2013.01)

(58) Field of Classification Search
CPC ........ F01D 25/002; F01D 25/34; F01D 25/36; F01D 15/06; F02C 7/32; B08B 3/003; B08B 9/00; F04D 29/705; F05D 2260/406; F05D 2220/32
See application file for complete search history.

(56) References Cited

U.S. PATENT DOCUMENTS

| | | | | |
|---|---|---|---|---|
| 5,868,860 A | * | 2/1999 | Asplund | .................. B08B 3/02 134/22.1 |
| 7,428,818 B2 | | 9/2008 | Hjerpe | |

(Continued)

FOREIGN PATENT DOCUMENTS

| | | | | |
|---|---|---|---|---|
| DE | 102013002636 A1 | * | 8/2014 | ............. B24C 1/003 |
| EP | 2239440 A1 | | 10/2010 | |

(Continued)

OTHER PUBLICATIONS

Translation of DE 102013002636. (Year: 2020).*

(Continued)

*Primary Examiner* — Alexander Markoff
(74) *Attorney, Agent, or Firm* — Fitch, Even, Tabin & Flannery LLP (57) ABSTRACT

A wash system for a gas turbine engine includes a core turning assembly having a motor configured to be mechanically coupled to the gas turbine engine. The rotor of the core turning assembly is further configured to rotate one or more components of a compressor section or a turbine section of the gas turbine engine at a rotational speed greater than two (2) revolutions per minute and less than five hundred (500) revolutions per minute during washing operations of the gas turbine engine.

14 Claims, 9 Drawing Sheets

(56) References Cited

U.S. PATENT DOCUMENTS

| | | | |
|---|---|---|---|
| 7,445,677 B1* | 11/2008 | Asplund | B08B 3/02 134/134 |
| 8,196,276 B2 | 6/2012 | Sassatelli et al. | |
| 9,328,092 B2 | 5/2016 | Nirogi et al. | |
| 9,816,441 B2 | 11/2017 | Cass et al. | |
| 9,816,511 B2* | 11/2017 | Marcucci | F04D 17/10 |
| 10,005,111 B2* | 6/2018 | Eriksen | F01D 5/186 |
| 10,174,630 B2 | 1/2019 | Scarponi et al. | |
| 10,385,723 B2* | 8/2019 | Flynn | F02C 7/00 |
| 2002/0096197 A1 | 7/2002 | Ackerman et al. | |
| 2004/0055626 A1* | 3/2004 | Hata | F01D 21/10 134/57 R |
| 2005/0035096 A1* | 2/2005 | Kilburn | B08B 7/0042 219/121.68 |
| 2005/0199270 A1* | 9/2005 | Watt | B08B 3/02 134/22.1 |
| 2006/0048796 A1* | 3/2006 | Asplund | B08B 3/02 134/21 |
| 2006/0260323 A1* | 11/2006 | Moulebhar | F01D 21/003 60/793 |
| 2007/0000528 A1* | 1/2007 | Asplund | B08B 3/02 134/166 R |
| 2007/0028947 A1* | 2/2007 | Erickson | F01D 25/002 134/22.18 |
| 2007/0151258 A1* | 7/2007 | Gaines | F02C 7/36 60/792 |
| 2008/0040872 A1* | 2/2008 | Hjerpe | B05B 7/166 15/3 |
| 2008/0087301 A1* | 4/2008 | Lee | B08B 3/02 134/18 |
| 2008/0216873 A1* | 9/2008 | Hjerpe | B08B 9/093 134/33 |
| 2009/0260660 A1* | 10/2009 | Asplund | B08B 3/02 134/34 |
| 2010/0200023 A1* | 8/2010 | Giljohann | B08B 9/0321 134/33 |
| 2010/0300117 A1* | 12/2010 | Moulebhar | F01D 21/003 60/801 |
| 2011/0146729 A1* | 6/2011 | Giljohann | B08B 9/0321 134/33 |
| 2011/0299971 A1 | 12/2011 | Lemmers, Jr. et al. | |
| 2012/0134777 A1 | 5/2012 | Eleftheriou et al. | |
| 2013/0074879 A1 | 3/2013 | Battaglioli et al. | |
| 2013/0098179 A1 | 4/2013 | Beier et al. | |
| 2013/0149102 A1* | 6/2013 | Marcucci | F04D 17/10 415/1 |
| 2013/0174869 A1* | 7/2013 | Rosing | F01D 25/002 134/7 |
| 2014/0124007 A1 | 5/2014 | Scipio et al. | |
| 2015/0000693 A1* | 1/2015 | Byrd | F01D 25/002 134/1 |
| 2015/0159506 A1 | 6/2015 | Scipio et al. | |
| 2015/0159556 A1 | 6/2015 | Scipio et al. | |
| 2015/0233263 A1 | 8/2015 | Battaglioli et al. | |
| 2016/0090859 A1 | 3/2016 | Aggas | |
| 2016/0160679 A1 | 6/2016 | Griffiths et al. | |
| 2016/0186602 A1 | 6/2016 | Saenz | |
| 2016/0305277 A1 | 10/2016 | Pecchioli et al. | |
| 2017/0130649 A1* | 5/2017 | Bewlay | B08B 7/028 |
| 2017/0204739 A1* | 7/2017 | Rawson | B08B 3/003 |
| 2017/0209904 A1* | 7/2017 | Eriksen | F01D 5/081 |
| 2017/0268377 A1* | 9/2017 | Flynn | B08B 9/00 |
| 2020/0141269 A1* | 5/2020 | Rawson | B08B 5/02 |

FOREIGN PATENT DOCUMENTS

| | | | |
|---|---|---|---|
| EP | 2 472 083 A2 | 7/2012 | |
| EP | 2881551 A1 | 6/2015 | |

OTHER PUBLICATIONS

International Search Report and Written Opinion issued in connection with corresponding PCT Application No. PCT/US2017/060083 dated Feb. 19, 2018.

European Search Report Corresponding to Application No. 17875484 dated Jun. 15, 2020.

* cited by examiner

GAS TURBINE ENGINE WASH SYSTEM

FIELD

The present subject matter relates generally to a wash system for a gas turbine engine.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

During operation, a substantial amount of air is ingested by such gas turbine engines. However, such air may contain foreign particles. A majority of the foreign particles will follow a gas path through the engine and exit with the exhaust gases. However, at least certain of these particles may stick to certain components within the gas turbine engine's gas path, potentially changing aerodynamic properties of the engine and reducing engine performance.

In order to remove such foreign particles from within the gas path of the gas turbine engine, water or other fluids may be directed through an inlet of the gas turbine engine, while the core engine is cranked using a starter motor. For example, the starter motor may be configured to rotate the core engine at several thousand revolutions per minute during these wash operations. Such movement may enhance the wash results by mechanical engagement between the water and components. Additionally, such rotation may also urge the water through the engine and out the exhaust section.

However, the inventors of the present disclosure have discovered that rotating the core engine at the relatively high rotational speeds during wash operations may not allow the water or wash fluid time to react with any foreign particles within the gas path of the gas turbine engine. Accordingly, the inventors of the present disclosure have discovered that a wash system configured to provide the water or wash fluid additional time to react with any foreign particles within the gas path of the gas turbine engine during washing operations would be useful.

BRIEF DESCRIPTION

Aspects and advantages of the invention will be set forth in part in the following description, or may be obvious from the description, or may be learned through practice of the invention.

In one embodiment of the present disclosure, a wash system for a gas turbine engine is provided. The gas turbine engine includes a compressor section, a turbine section, and an accessory gearbox. The wash system includes a core turning assembly having a motor configured to be mechanically coupled to the gas turbine engine for rotating one or more components of the compressor section or the turbine section at a rotational speed greater than two (2) revolutions per minute and less than five hundred (500) revolutions per minute during washing operations of the gas turbine engine.

In another exemplary embodiment of the present disclosure, a wash system for a gas turbine engine is provided. The gas turbine engine includes a compressor section and a turbine section. The wash system includes an accessory gearbox configured to be attached to the gas turbine engine and a core turning assembly. The core turning assembly includes a motor attached to the accessory gearbox and configured to rotate one or more components of the compressor section or the turbine section at a rotational speed greater than two (2) revolutions per minute and less than five hundred (500) revolutions per minute when the accessory gearbox is attached to the gas turbine engine and during washing operations of the gas turbine engine.

In an exemplary aspect of the present disclosure, a method for washing a gas turbine engine is provided. The method includes attaching a motor of a core turning assembly to an accessory gearbox of the gas turbine engine. The method also includes rotating at least a portion of a compressor section or a turbine section of the gas turbine engine using the motor of the core turning assembly. The method also includes providing a wash fluid to a core air flowpath of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
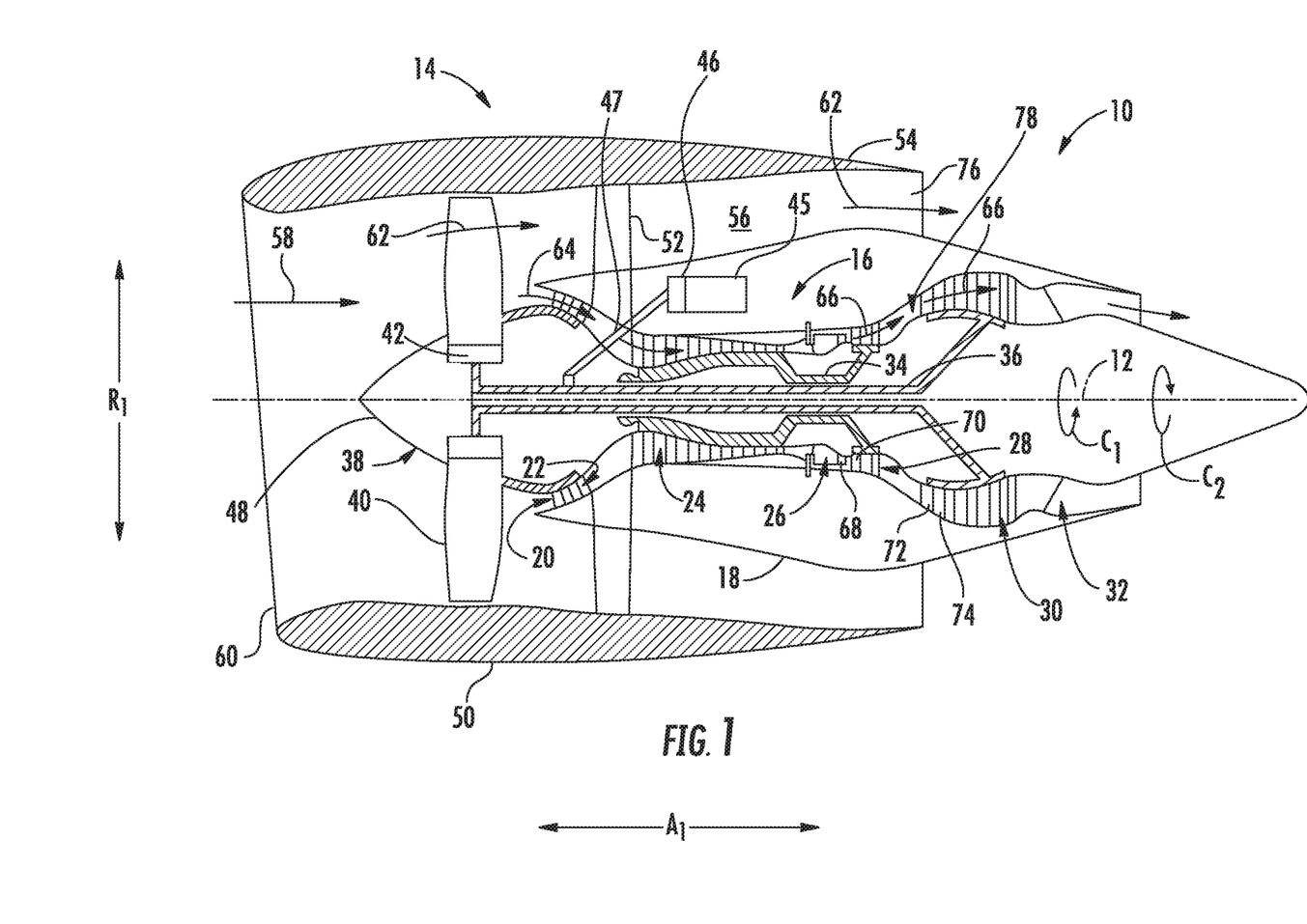
FIG. 1 is a schematic, cross-sectional view of a gas turbine engine in accordance with an exemplary embodiment of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, and turbine section together define at least in part a core air flowpath 37 of the turbofan engine 10. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a fan 38 having a plurality of fan blades 40 coupled to a disk 42 in a spaced apart manner. As is depicted, the fan blades 40 extend outwardly from disk 42 generally along the radial direction R. The disk 42 is covered by rotatable front nacelle 48 aerodynamically contoured to promote an airflow through the plurality of fan blades 40. The fan blades 40 and disk 42 are together rotatable about the longitudinal axis 12 by LP shaft 36.

As is depicted, the exemplary turbofan engine 10 further includes an accessory gearbox 45 attached to the gas turbine engine and mechanically coupled to a spool of the gas turbine engine. More specifically, the accessory gearbox 45 is attached to the core turbine engine 16 of the turbofan engine 10, and is mechanically coupled to the LP spool 36 of the turbofan engine 10 through a transfer gearbox 46 and transfer shaft 47. Although not depicted, an electric machine (i.e., a starter motor/generator) may be coupled to the accessory gearbox 45 for, e.g., starting the turbofan engine 10 and/or generating electrical power once the turbofan engine 10 is running.

Referring still to the exemplary embodiment of FIG. 1, the exemplary fan section 14 includes an annular fan casing or outer nacelle 50 that circumferentially surrounds the fan 38 and/or at least a portion of the core turbine engine 16. The nacelle 50 is supported relative to the core turbine engine 16 by a plurality of circumferentially-spaced outlet guide vanes 52. Additionally, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may be configured as a geared turbofan engine (i.e., including a reduction gearbox); may not include variable-pitch fan blades; may include any other suitable number of spools, compressors, or turbines; etc. Additionally, the turbofan engine 10 may instead be configured as any other suitable aeronautical gas turbine engine, such as a turboshaft engine, turboprop engine, turbojet engine, etc. Additionally, still, the turbofan engine 10 may instead be configured as an aeroderivative gas turbine engine (e.g., for nautical applications), an industrial gas turbine engine, or as any other suitable gas turbine engine.

Figure 2:
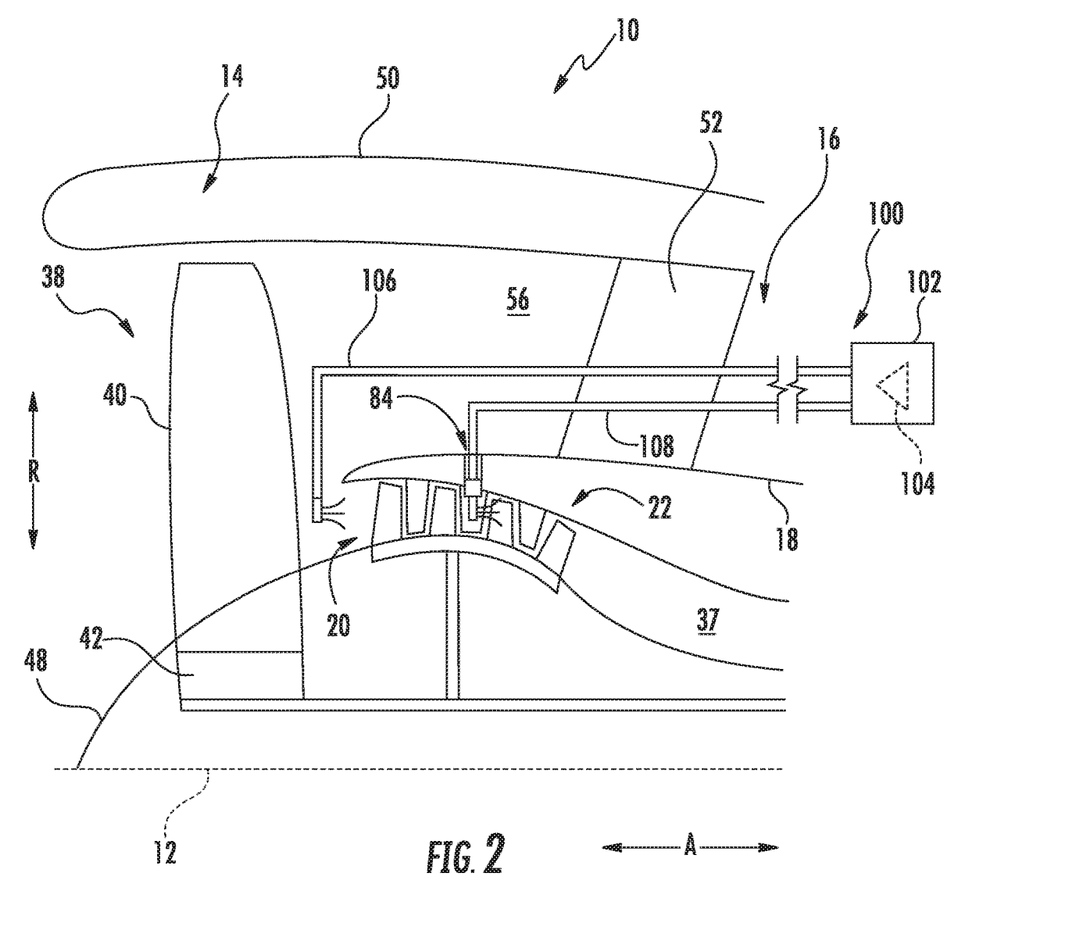
FIG. 2 is a schematic, cross-sectional view of a compressor section of the exemplary gas turbine engine of FIG. 1 and a wash system in accordance with an exemplary embodiment of the present disclosure.
Figure 3:
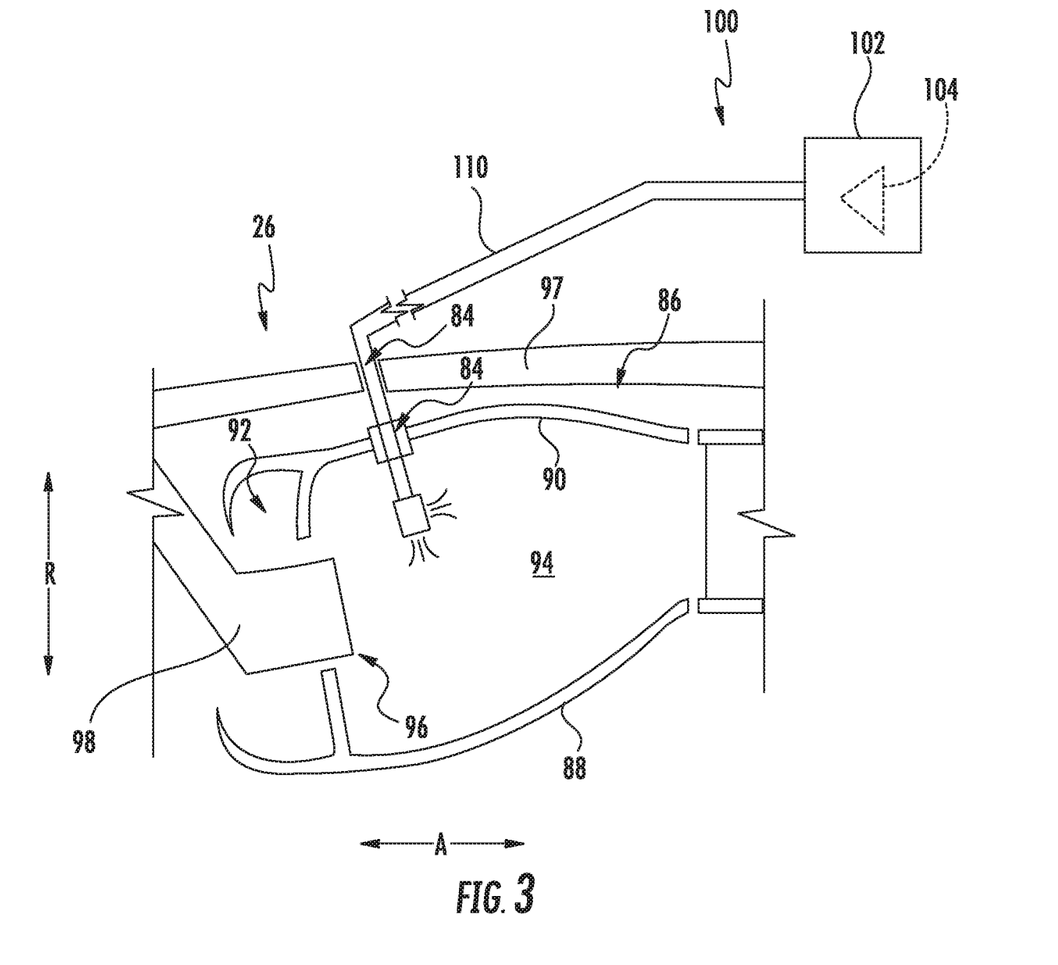
FIG. 3 is a schematic, cross-sectional view of a combustion section of the exemplary gas turbine engine of FIG. 1 and a wash system in accordance with an exemplary embodiment of the present disclosure.

Moreover, it will be appreciated that after prolonged use of the turbofan engine 10 of FIG. 1, deposits, foreign particles, and other sediments may become attached to or form on certain of the components within the core air flowpath 37 of the turbofan engine 10. Accordingly, it may be beneficial at certain intervals to wash the turbofan engine 10 to remove such deposits, foreign particles, and other sediments. Referring now to FIGS. 2 and 3, close-up views are provided of certain locations of the exemplary turbofan engine 10 of FIG. 1 during washing operations by a wash system 100.

Referring first to FIG. 2, the wash system 100 is depicted washing a forward end of the exemplary turbofan engine 10 of FIG. 1. Specifically, the wash system 100 is depicted washing at least the LP compressor 22 of the compressor section of the turbofan engine 10. As is depicted, the LP compressor 22 includes a plurality of LP compressor rotor blades 80 rotatable with the LP shaft 36 and a plurality of stationary LP compressor stator vanes 82. Moreover, the turbofan engine 10 defines one or more inspection holes 84 leading to the core air flowpath 37 of the turbofan engine 10. For the embodiment depicted, the inspection holes 84 may also be referred to as borescope holes.

Additionally, for the embodiment depicted the wash system 100 generally includes a wash fluid source 102 having a pump 104 (shown in phantom) and one or more wash fluid lines. During the washing operations of the turbofan engine 10 (shown), the one or more wash fluid lines are each positioned in fluid communication with a location within the core air flowpath 37 of the turbofan engine 10 for providing a wash fluid to the core air flowpath 37 of the turbofan engine 10. More specifically, the exemplary wash system 100 depicted in FIG. 2 includes a first wash fluid line 106 having a nozzle at a distal end oriented to provide wash fluid through the inlet 20 of the core turbine engine 16 to the core air flowpath 37. The wash system 100 further includes a second wash fluid line 108 extending through an inspection hole 84 defined by the turbofan engine 10 at the LP compressor 22 of the compressor section. The second wash fluid line 108 similarly includes a nozzle, the nozzle positioned within the core air flowpath 37 at a distal end of the second wash fluid line 108 for providing wash fluid to a portion of the core air flowpath 37 extending through the LP compressor 22.

Referring now to FIG. 3 the wash system 100 is depicted washing a combustion section 26 of the exemplary turbofan engine 10 of FIG. 1. More specifically, the wash system 100 is depicted washing a combustor assembly 86 of the combustion section 26 of the exemplary turbofan engine 10 of FIG. 1. As is depicted, the combustor assembly 86 generally includes an inner liner 88 and an outer liner 90 spaced along the radial direction R. Additionally, the combustor assembly 86 includes a dome 92 at a forward end attached to or formed integrally with the inner and outer liners 88, 90. The dome 92, inner liner 88, and outer liner 90 together define at least in part a combustion chamber 94, which is configured as part of the core air flowpath 37 through the core turbine engine 16. Additionally, the dome 92 defines an opening 96 through which one or more fuel-air mixers 98 extend.

The exemplary combustion section 26 of the turbofan engine 10 depicted additionally defines one or more inspection holes 84 leading to the core air flowpath 37, or more specifically, leading to the combustion chamber 94. The exemplary inspection holes 84 depicted extend through an outer casing 97 surrounding the combustor assembly 86 and the outer liner 90 of the combustor assembly 86. In certain exemplary embodiments, the inspection holes 84 may be configured as borescope holes, or instead may be configured as igniter holes (i.e., where an igniter, not shown, of the combustor assembly 86 has been removed).

FIG. 3 further to depicts schematically the exemplary wash system 100. The exemplary wash system 100 of FIG. 3 may be the same wash system 100 as is described above with reference to FIG. 2. Accordingly, for the embodiment depicted the wash system 100 generally includes a wash fluid source 102 having a pump 104 (shown in phantom) and one or more wash fluid lines. During the washing operations of the turbofan engine 10 (shown), the one or more wash fluid lines are positioned in fluid communication with a location within the core air flowpath 37 of the turbofan engine 10 for providing a wash fluid to the core air flowpath 37 of the turbofan engine 10 during such washing operations. More specifically, the exemplary wash system 100 depicted in FIG. 3 includes a third wash fluid line 110 having a nozzle at a distal end positioned within the combustion chamber 94 to provide wash fluid to the combustion chamber 94. More specifically, still, the third wash fluid line 110 extends through the one or more inspection holes 84 defined in the combustion section 26 and into the combustion chamber 94 to provide wash fluid to the combustion chamber 94 during washing operations.

It will be appreciated, however, that the exemplary wash system 100 depicted in FIGS. 2 and 3 is provided by way of example only, and in other exemplary embodiments, the wash system 100 may have any other suitable configuration. For example, in other exemplary embodiments, the wash system 100 may further include wash lines extending through inspection holes 84 in or to the HP compressor 24, the HP turbine 28, the LP turbine 30, and/or any other suitable location to provide wash fluid to the core air flowpath 37. Additionally, or alternatively, in other exemplary embodiments, the wash system 100 may simply provide wash fluid to the core air flowpath 37 through the inlet 20 to the core turbine engine 16 (as is shown with the first wash fluid line 106 depicted in FIG. 2).

In certain exemplary embodiments, the wash fluid may be a foam detergent, such as a heated foam detergent. More specifically, in certain exemplary embodiments, the wash fluid may be a reactive foam detergent configured to react with and breakdown foreign particles within the core air flowpath 37. The benefits of such an embodiment will be appreciated more fully from the description below. Notably, however, in other exemplary embodiments, the wash fluid may instead be any other suitable wash fluid, such as a wash liquid including, e.g., water and detergent, or any other suitable wash fluid.

Figure 4:
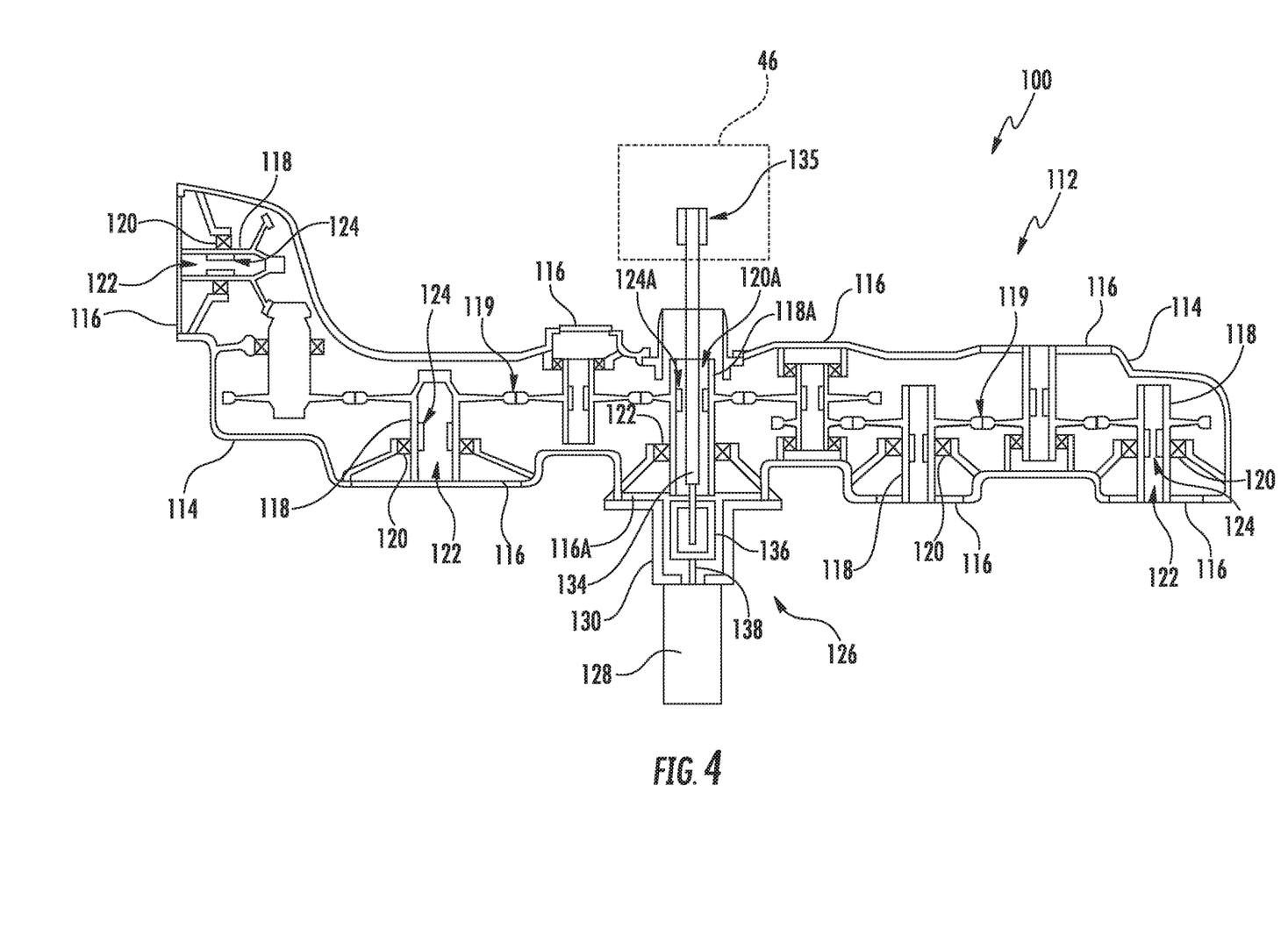
FIG. 4 is a schematic view of an accessory gearbox and a core turning assembly of a wash system in accordance with an exemplary embodiment of the present disclosure.

Referring now to FIG. 4, a schematic view is provided of an exemplary accessory gearbox 112 for a gas turbine engine, along with a wash system 100, in accordance with an exemplary embodiment of the present disclosure. The accessory gearbox 112 of FIG. 4 may be configured to be attached to the exemplary turbofan engine 10 of FIG. 1, similar to the exemplary accessory gearbox 45 depicted in FIG. 1, or alternatively may be configured to be attached to any other suitable gas turbine engine.

As is depicted, the exemplary accessory gearbox 112 generally includes an outer casing 114 surrounding various internal components of the accessory gearbox 112. The accessory gearbox 112 may be attached to a gas turbine engine at the outer casing 114. The accessory gearbox 112 additionally includes a plurality of accessory pads 116 positioned adjacent to a respective plurality of accessory gears 118. Each of the accessory gears 118 is mechanically coupled to one another through, e.g., meshing teeth 119 to transmit torque between the plurality of accessory gears 118. Additionally, each of the plurality of accessory gears 118 is supported within the outer casing 114 of the accessory gearbox 112 by one or more bearings 120. Moreover, for the exemplary embodiment depicted, each accessory gear 118 defines a cylindrical opening 122 with a splined portion 124 for coupling to the respective accessory systems (not shown). For example, during operation of the gas turbine engine, accessory systems may be attached to the respective accessory pads 116 and may include a shaft (not shown) extending into the accessory gearbox 112. The shafts of the accessory systems may extend through the respective cylindrical opening 122 and couple to the respective splined portion 124 in order to mechanically couple the accessory system to the respective accessory gear 118. Rotation of an accessory gear 118 may therefore correspondingly drive a respective accessory system. The accessory systems may include, for example, a lubrication oil system of the gas turbine engine, etc.

Notably, however, in other exemplary embodiments, the accessory gearbox 112 may include any other suitable configuration of accessory pads 116 and accessory gears 118. Additionally, in other exemplary embodiments, one or more of the plurality of accessory gears 118 may be coupled to a respective accessory system in any other suitable manner.

Referring still to FIG. 4, the accessory gearbox 112 may additionally be used to startup the gas turbine engine. For example, at least one of the accessory pads 116 and accessory gears 118 is a starter gear 118A and starter pad 116A. A starter motor/generator (not shown) is configured to be attached to the starter pad 116A and generally includes a driveshaft (not shown) that extends through the accessory gearbox 112 (similar to the horizontal driveshaft 134, described below) and mechanically couples to the starter gear 118A. The driveshaft of the starter motor/generator includes a splined end (similar to the splined end 135 of the horizontal driveshaft 134, described below) that couples to a transfer gearbox 46 (depicted in phantom). The transfer gearbox 46 is, in turn, mechanically coupled to the core turbine engine 16 (see, e.g., FIG. 1).

By contrast, once the gas turbine engine is operating under its own power, rotational power may be transferred from the core turbine engine 16, through the transfer gearbox 46, through the driveshaft, to the starter gear 118A, and accordingly, to each of the additional accessory gears 118 and accessory systems. Such a configuration allows for the core turbine engine 16 to power the various accessory systems during operation of the gas turbine engine.

Notably, during washing operations of the gas turbine engine, it is beneficial to rotate certain components of the core turbine engine 16, including, e.g., one or more of the LP compressor 22, HP compressor 24, HP turbine 28, and LP turbine 30, to urge wash fluid through the core air flowpath 37. Prior washing operations have used the starter motor/generator to rotate these components of the core turbine engine 16 during washing operations. The starter motor/generator, however, is typically configured as a relatively high power motor for rotating these components of the gas turbine engine at relatively high rotational speeds. Such may be beneficial to provide, e.g., an abrasive and kinematic impact of the wash fluid against the components of the gas turbine engine. However, the inventors of the present disclosure have discovered that contrary to these conventional and known benefits, rotating these components at the relatively high rotational speeds may not provide the wash fluid much with time to react with the components within the core air flowpath 37 of the gas turbine engine. For example, when the wash fluid is configured as a reactive foam wash fluid, rotating the components of the gas turbine engine and the relatively high rotational speeds may prevent the reactive foam wash fluid from operating is desired.

Accordingly, the inventors of the present disclosure have provided a core turning assembly 126 configured to rotate one or more components of the gas turbine engine at a more desirable rotational speed. More specifically, the core turning assembly 126 includes a motor 128 configured to be mechanically coupled to the gas turbine engine for rotating one or more components of the compressor section or the turbine section of the gas turbine engine during washing operations of the gas turbine engine. For example, one or more of the wash fluid lines (e.g., one or more of the first, second, or third wash fluid lines 106, 108, 110) may be configured for providing a wash fluid to at least one of the compressor section or the turbine section of the gas turbine engine during rotation of the one or more components of at least one of the compressor section or the turbine section by the motor 128.

As will be appreciated, in at least certain exemplary embodiments, the one or more components of the compressor section or the turbine section of the gas turbine engine rotated by the motor during such washing operations may include a compressor of the compressor section and a turbine of the turbine section, such as the LP compressor 22 of the compressor section and the LP turbine 30 of the turbine section. As will further be appreciated, rotating the LP compressor 22 and LP turbine 30 will generate a flow through the core air flowpath 37, which in turn will rotate the HP components (e.g., the HP compressor 24 and HP turbine 28 for the exemplary turbofan 10 of FIG. 1).

Figure 5:
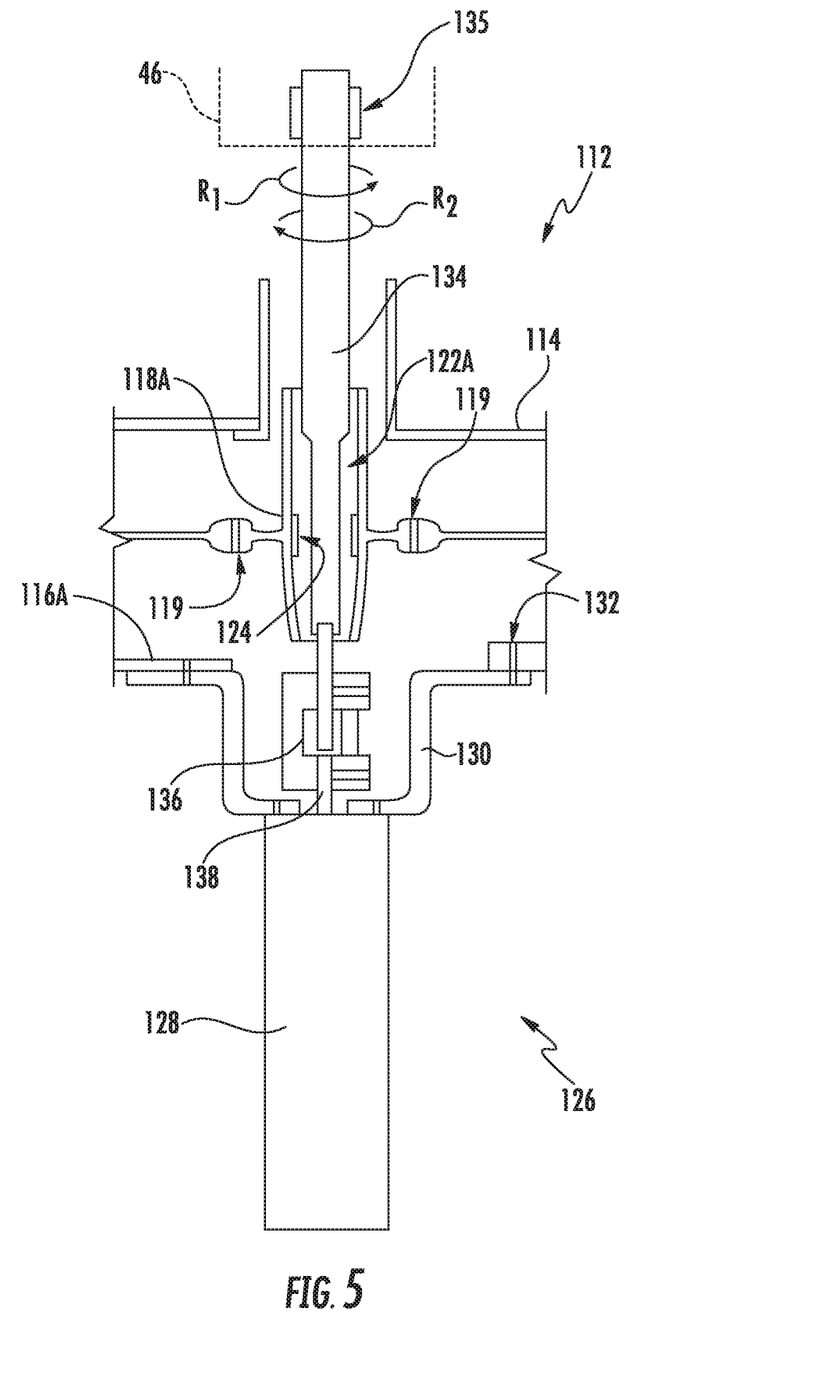
FIG. 5 is a close-up, schematic view of the exemplary core turning assembly of the wash system of FIG. 4.

Referring now also to FIG. 5, a close-up view of the core turning assembly 126 of FIG. 4 is provided. For the exemplary embodiment depicted in FIGS. 4 and 5, the motor 128 of the core turning assembly 126 is attached to the accessory gearbox 112, or rather to the starter pad 116A of the accessory gearbox 112, through a bracket 130. The bracket 130 is configured to align with the existing structure of the accessory gearbox 112, and more specifically is configured to attach to existing openings 132 in the outer casing 114 of the accessory gearbox 112. Additionally, the exemplary core turning assembly 126 of FIG. 4 further includes a horizontal driveshaft 134 mechanically coupled to the motor 128 and extending at least partially through the accessory gearbox 112. As is depicted, the horizontal driveshaft 134 further includes a splined end 135 configured to be coupled to the transfer gearbox 46 to transmit torque through the transfer gearbox 46 to one or more components of at least one of the compressor section or the turbine section of the gas turbine engine.

Notably, it will be appreciated that for the embodiment depicted, the motor 128 is mechanically coupled to the horizontal driveshaft 134 through a flexible coupling 136. The flexible coupling 136 may allow for a misalignment of a rotor extension 138 of the motor 128 from the horizontal driveshaft 134 without causing damage to, e.g., the accessory gearbox 112, the transfer gearbox 46, or other components of the gas turbine engine. For the exemplary embodiment depicted, the flexible coupling 136 is configured as a spider coupling. However, in other embodiments, the flexible coupling 136 may be configured in any other suitable manner. Further, in still other embodiments, it will be appreciated that the core turning assembly 126 may not include the flexible coupling 136, and instead, the rotor extension 138 of the motor 128 may be rigidly attached to the horizontal driveshaft 134.

Referring still to FIGS. 4 and 5, the horizontal driveshaft 134 is configured to, and does for the embodiment depicted, extend through the starter gear 118A of the accessory gearbox 112. Notably, however, the horizontal driveshaft 134 of the core turning assembly 126 is disengaged from the starter gear 118A when the horizontal driveshaft 134 is extending through the starter gear 118A. More particularly, the horizontal driveshaft 134 is configured to rotate independently of the starter gear 118A of the accessory gearbox 112 when the horizontal driveshaft 134 is extending through the starter gear 118A of the accessory gearbox 112. As may be seen more clearly in FIG. 5, the starter gear 118A includes a splined portion 124A within the cylindrical opening 122A through which the horizontal driveshaft 134 extends. However, the portion of the horizontal driveshaft 134 extending through the splined portion 124A of the starter gear 118A (when the horizontal driveshaft 134 is installed, as shown) does not engage the splined portion 124A of the star gear. Particularly, for the embodiment depicted, the portion of the horizontal driveshaft 134 positioned adjacent to the splined portion 124A of the starter gear 118A defines a diameter less than an inner diameter of the splined portion 124A of the starter gear 118A. Accordingly, the horizontal driveshaft 134 may rotate freely and independently relative to the starter gear 118A.

With such a configuration, the motor 128 may rotate the horizontal driveshaft 134, and thus may rotate the one or more components of at least one of the compressor section or turbine section of the gas turbine engine, without rotating any of the plurality of accessory gears 118 within the accessory gearbox 112. Such may allow for a more efficient core turning assembly 126, and further may prevent a user or technician from having to remove all accessory systems from the accessory gearbox 112 during cleaning operations. (For example, a user or technician may not want the lubrication oil system to operate during cleaning operations.) More specifically, being able to rotate one or more components of the compressor section or turbine section of the gas turbine engine, without rotating any of the plurality of accessory gears 118 within the accessory gearbox 112, may allow for cleaning of the components within the core air flowpath 37, without the cleaning media (fluid, foam, etc.) being drawn into the accessory systems. For example, such a configuration may ensure any various lubrication oil sumps and lubrication oil pumps do not draw in cleaning media during cleaning operations.

Moreover, it will be appreciated that as the other accessory systems are not rotated by the motor 128 during such washing operations of the gas turbine engine, the motor 128 may be configured to rotate in any suitable direction. More specifically, for the embodiment depicted, the motor 128 is configured to rotate in a first rotational direction R1 and a second rotational direction R2. The first and second rotational directions of the motor 128 (or rather of the rotor extension 138 of the motor 128) may correspond to different rotational directions of the components of the gas turbine engine. For example, a motor 128 in accordance with such an exemplary embodiment may be configured to rotate the one or more components of at least one of the compressor section or the turbine section and a first circumferential direction C1 and in a second circumferential direction C2 (see FIG. 1). The second circumferential direction C2 is opposite the first circumferential direction C1. Accordingly, the motor 128 may effectively rotate the gas turbine engine in a forward direction and in a reverse direction to allow for more efficient washing of the gas turbine engine.

In certain exemplary embodiments, the motor 128 of the core turning assembly 126 may be an electric motor, such as a three-phase electric motor, or alternatively may be a pneumatic or hydraulic motor. Regardless, the motor 128 may be a relatively small motor 128. For example, the motor 128 may be a ten (10) horsepower motor or less, such as an eight (8) horsepower motor less, such that a five (5) horsepower motor or less. Further, still, the motor 128 may be configured to rotate the one or more components of the compressor section or the turbine section at a relatively low rotational speed. For example, the motor 128 may be configured for rotating the one or more components of the compressor section or the turbine section of the gas turbine engine at a rotational speed greater than two (2) revolutions per minute and less than five hundred (500) revolutions per minute during washing operations of the gas turbine engine. For example, the motor 128 may be configured for rotating the one or more components of the compressor section or the turbine section of the gas turbine engine at a rotational speed greater than about five (5) revolutions per minute, greater than about ten (10) revolutions per minute, or greater than about thirty (30) revolutions per minute, and less than about four hundred and seventy-five (475) revolutions per minute, less than about four hundred and fifty (450) revolutions per minute, or less than about four hundred (400) revolutions per minute. As noted above, in certain exemplary aspects, the one or more components of the compressor section or the turbine section may include a compressor and a turbine, such as an LP compressor 22 and an LP turbine 30. Additionally, it should be appreciated, that as used herein, terms of approximation such as "about" or "approximately," refer to being within a ten percent (10%) margin.

Utilizing a wash system in accordance with one or more the above embodiments with a gas turbine engine may allow for the wash system to more effectively wash the gas turbine engine. More specifically, utilizing a motor of the core turning assembly capable of rotating certain components of the gas turbine engine at the disclosed rotational speeds during washing operations of the gas turbine engine may allow for wash fluid of the wash system to better wash the components of the gas turbine engine. For example, when the wash fluid is configured as a reactive wash fluid, such as a reactive foam, the reactive wash fluid may have more time to react with dirt or other unwanted particles on the components of the gas turbine engine to clean such components of the gas turbine engine.

It should be appreciated, however, that in other exemplary embodiments, the wash system 100 may have any other suitable configuration. For example, referring now to FIGS. 6 and 7, two additional embodiments the present disclosure are provided. More specifically, FIGS. 6 and 7 each depict an accessory gearbox 112 generally including an outer casing 114 and a plurality of inner accessory gears 118, each positioned adjacent to a respective accessory gear pad 116. The wash systems 100 of each of these embodiments generally includes a core turning assembly 126 having a motor 128 attached to the accessory gearbox 112 for rotating one or more components of a compressor section or a turbine section of a gas turbine engine.

Figure 6:
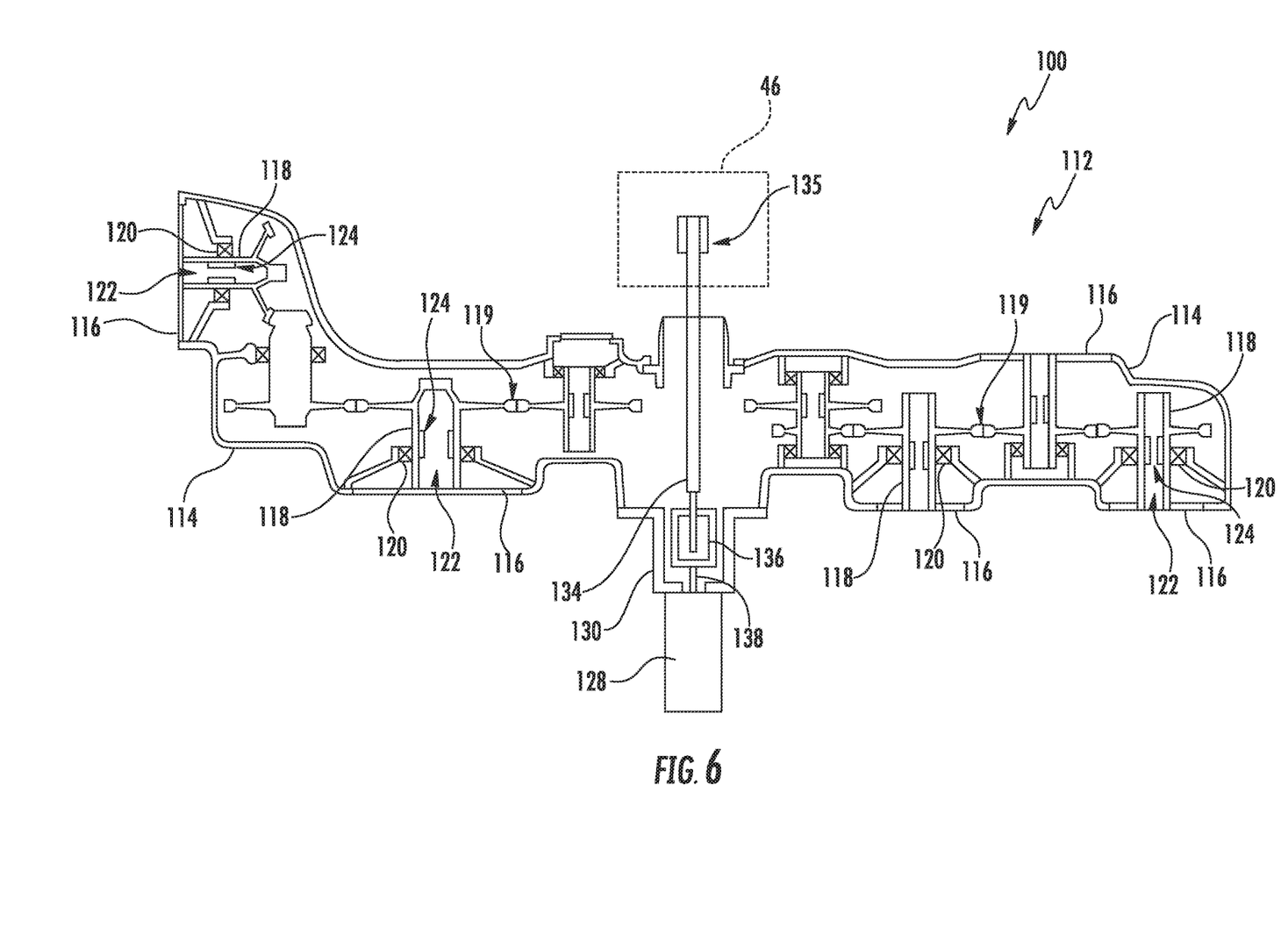
FIG. 6 is a schematic view of an accessory gearbox and a core turning assembly of a wash system in accordance with another exemplary embodiment of the present disclosure.

Referring first specifically to FIG. 6, the core turning assembly 126 further includes a horizontal driveshaft 134 mechanically coupled to the motor 128 through a flexible coupling 136. The horizontal driveshaft 134 extends at least partially through the accessory gearbox 112. As with the exemplary embodiment of FIGS. 4 and 5, the horizontal driveshaft 134 is disengaged from the plurality of inner accessory gears 118 of the accessory gearbox 112, and is rotatable independently of the plurality of accessory gears 118 of the accessory gearbox 112. However, for the exemplary embodiment of FIG. 6, the starter gear 118A and starter pad 116A has been removed from the accessory gearbox 112, such that the horizontal driveshaft 134 does not extend through the starter gear 118A of the accessory gearbox 112. Regardless, however, without the starter gear 118A, the horizontal driveshaft 134 is free to rotate within the accessory gearbox 112 without engaging the remaining plurality of accessory gears 118 within the outer casing 114 of the accessory gearbox 112.

Figure 7:
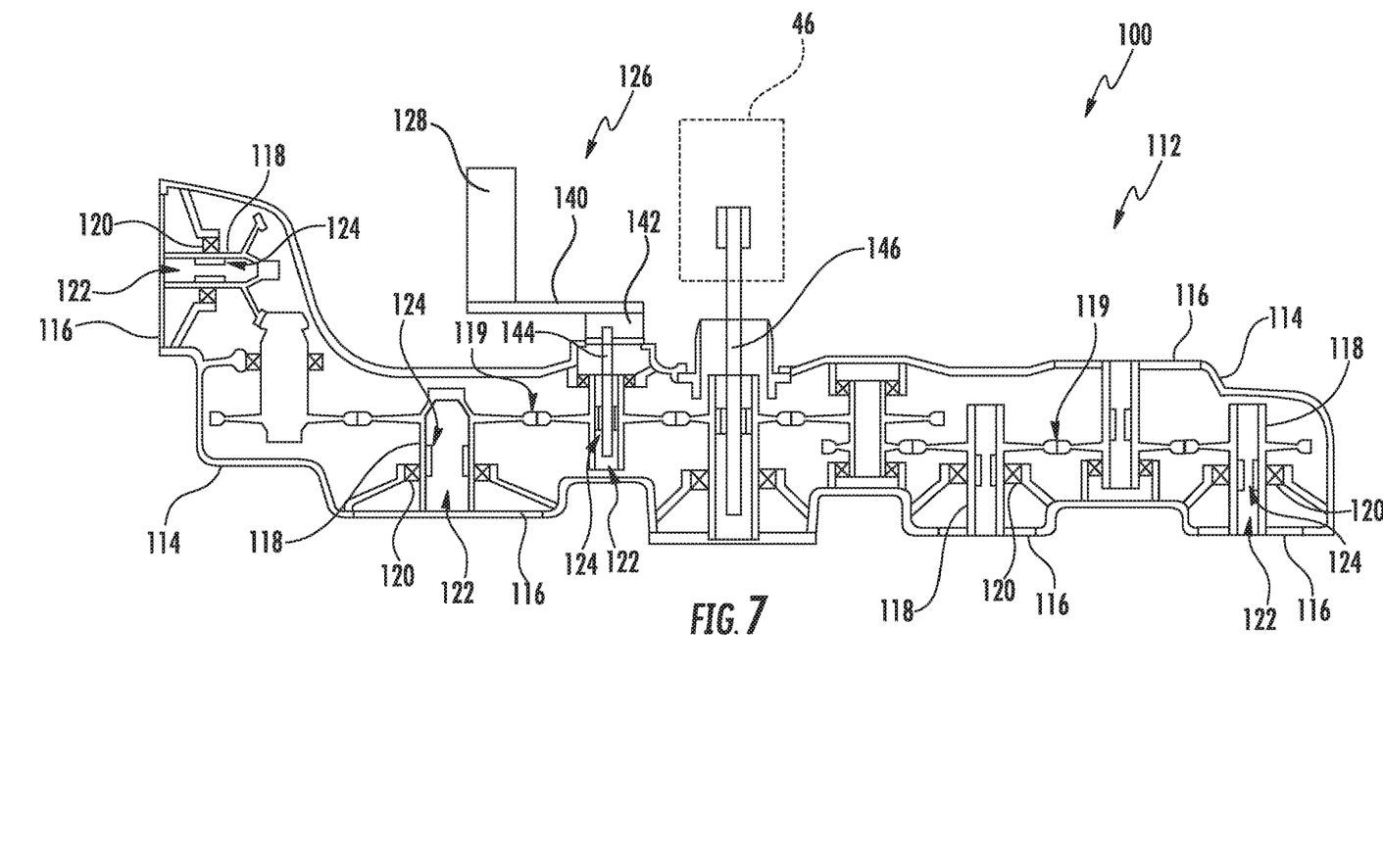
FIG. 7 is a schematic view of an accessory gearbox and a core turning assembly of a wash system in accordance with yet another exemplary embodiment of the present disclosure.

Referring now specifically to FIG. 7, the core turning assembly 126 further includes an offset tool 140 and an adapter 142. The adapter 142 is configured for attachment to the accessory gearbox 112. More specifically, the adapter 142 is configured for attachment to, and is attached to, an accessory pad 116 of the accessory gearbox 112, other than the starter pad 116A. Further, the adapter 142 is directly mechanically coupled an accessory gear 118 of the accessory gearbox 112 other than the starter gear 118A of the accessory gearbox 112. For the embodiment depicted, the exemplary adapter 142 depicted generally includes a shaft 144 extending through a cylindrical opening 122 of the accessory gear 118 configured to couple to a splined portion 124 of the accessory gear 118.

The offset tool 140 is mechanically coupled to both the adapter 142 and the motor 128, such that the motor 128 is configured for attachment to, and is attached to, the accessory gearbox 112 through the offset tool 140 and adapter 142. Further, the motor 128 is drivingly attached to the accessory gearbox 112 through the offset tool 140 and adapter 142. For example, in certain exemplary embodiments, the offset tool 140 may include a chain, a belt, or other similar mechanism to drivingly couple a rotor extension 138 of the motor 128 to the shaft 144 of the adapter 142.

Further, as will be appreciated, the accessory gear 118 to which the motor 128 is drivingly connected may rotate the components of the gas turbine engine by transferring a torque from the motor 128, through the offset tool 140 and adapter 142, to the accessory gear 118, to the starter gear 118A, to a driveshaft 146 of the accessory gearbox 112, and to and through a transfer gearbox 46 to the component of the gas turbine engine.

The wash system 100 configured in accordance with the embodiment of FIG. 7 may allow for attachment of the core turning assembly 126 in a relatively close or tight clearance area without requiring substantial disassembly of the gas turbine engine or the accessory gearbox 112.

Figure 8:
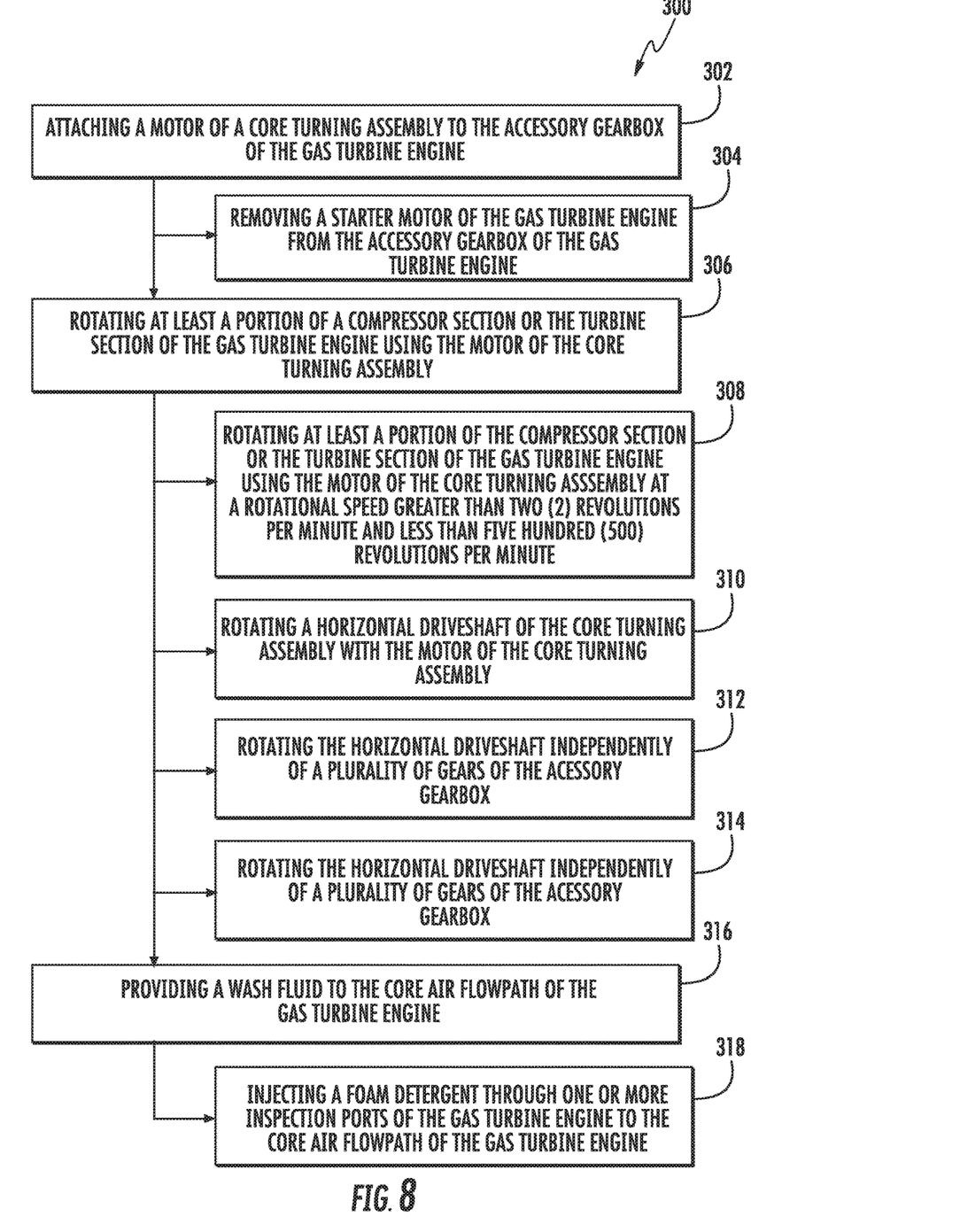
FIG. 8 is a flow diagram of a method for washing a gas turbine engine in accordance with an exemplary aspect of the present disclosure.

Referring now to FIG. 8 a flow diagram is provided of a method 300 for washing a gas turbine engine. The method 300 may be utilized in certain exemplary aspects with one or more of the exemplary gas turbine engines and exemplary wash systems described above with reference to FIGS. 1 through 6. Accordingly, the gas turbine engine may generally include a compressor section, a combustion section, and a turbine section together defining at least in part a core air flowpath. The gas turbine engine may further include an accessory gearbox attached to a core turbine engine of the gas turbine engine.

As is depicted in FIG. 8, the exemplary method 300 generally includes at (302) attaching a motor of a core turning assembly to the accessory gearbox of the gas turbine engine. In certain exemplary embodiments, attaching the motor of the core turning assembly to the accessory gearbox at (302) may include at (304) removing a starter motor of the gas turbine engine from the accessory gearbox of the gas turbine engine. With such an exemplary aspect, attaching the motor of the core turning assembly to the accessory gearbox at (302) may further include attaching the motor to a starter pad of the accessory gearbox (see, e.g., FIGS. 4 and 5). Alternatively, with such an exemplary aspect, attaching the motor of the core turning assembly to the accessory gearbox at (302) may further include removing the starter gear of the accessory gearbox (see, e.g., FIG. 6).

Further, the exemplary method 300 includes at (306) rotating at least a portion of a compressor section or the turbine section of the gas turbine engine using the motor of the core turning assembly. For the exemplary aspect depicted, rotating at least a portion of the compressor section or the turbine section of the gas turbine engine using the motor at (306) includes at (308) rotating at least a portion of the compressor section or the turbine section of the gas turbine engine using the motor of the core turning assembly at a rotational speed greater than two (2) revolutions per minute and less than five hundred (500) revolutions per minute.

Moreover, referring still to the exemplary aspect depicted in FIG. 8, rotating at least a portion of the compressor section or the turbine section of the gas turbine engine using the motor at (306) further includes at (310) rotating a horizontal driveshaft of the core turning assembly with the motor of the core turning assembly. The horizontal driveshaft extends at least partially through the accessory gearbox. It should be appreciated that the horizontal driveshaft may extend through the starter gear of the accessory gearbox, or alternatively, may extend through a portion of the accessory gearbox from which the starter gear was removed. Regardless, for the exemplary aspect depicted, rotating the horizontal driveshaft at (310) further includes at (312) rotating the horizontal driveshaft independently of a plurality of gears of the accessory gearbox.

Furthermore, with such an exemplary aspect, in which the horizontal driveshaft is rotated at (312) independently of a plurality of gears the accessory gearbox, the motor may be free to rotate the gas turbine engine in any direction. Accordingly, for the exemplary aspect depicted, rotating at least a portion of the compressor section or the turbine section of the gas turbine engine at (306) further includes at (314) rotating at least a portion of the compressor section or the turbine section in a first circumferential direction using the motor of the core turning assembly and subsequently rotating at least a portion of the compressor section or the turbine section in a second circumferential direction using the motor of the core turning assembly.

Referring still to FIG. 8, the exemplary aspect depicted further includes at (316) providing a wash fluid to the core air flowpath of the gas turbine engine. More particularly, for the exemplary aspect depicted, providing the wash fluid to the core air flowpath of the gas turbine engine at (316) includes at (318) injecting a foam detergent through one or more inspection ports of the gas turbine engine to the core air flowpath of the gas turbine engine.

It should be appreciated, however, that in other exemplary aspects of the present disclosure, any other suitable method for washing a gas turbine engine may be provided. For example, referring now to FIG. 9, a flow diagram is provided of method 400 for washing a gas turbine engine in accordance with another exemplary aspect of the present disclosure. The exemplary method 400 may be similar to the exemplary method 300. For example, as with the exemplary method 300, the method 400 may be utilized in certain exemplary aspects with one or more of the exemplary gas turbine engines and exemplary wash systems described above with reference to FIGS. 1 through 6.

Also similar to the method 300, the exemplary method 400 generally includes at (402) attaching a motor of the core turning assembly to an accessory gearbox of the gas turbine engine. However, for the exemplary aspect of FIG. 9, attaching the motor of the core turning assembly to the accessory gearbox at (402) generally includes at (404) attaching the motor of the core turning assembly to an accessory pad of the accessory gearbox other than a starter pad of the accessory gearbox.

Additionally, the exemplary method 400 includes at (406) rotating at least a portion of the compressor section or turbine section of the gas turbine engine using the motor of the core turning assembly. Again, however, for the exemplary aspect depicted in FIG. 9, rotating at least a portion of the compressor section or the turbine section of the gas turbine engine at (406) includes rotating an accessory gear of the accessory gearbox using the motor of the core turning assembly—the accessory gear being rotated at (406) being an accessory gear other than the starter gear.

Figure 9:
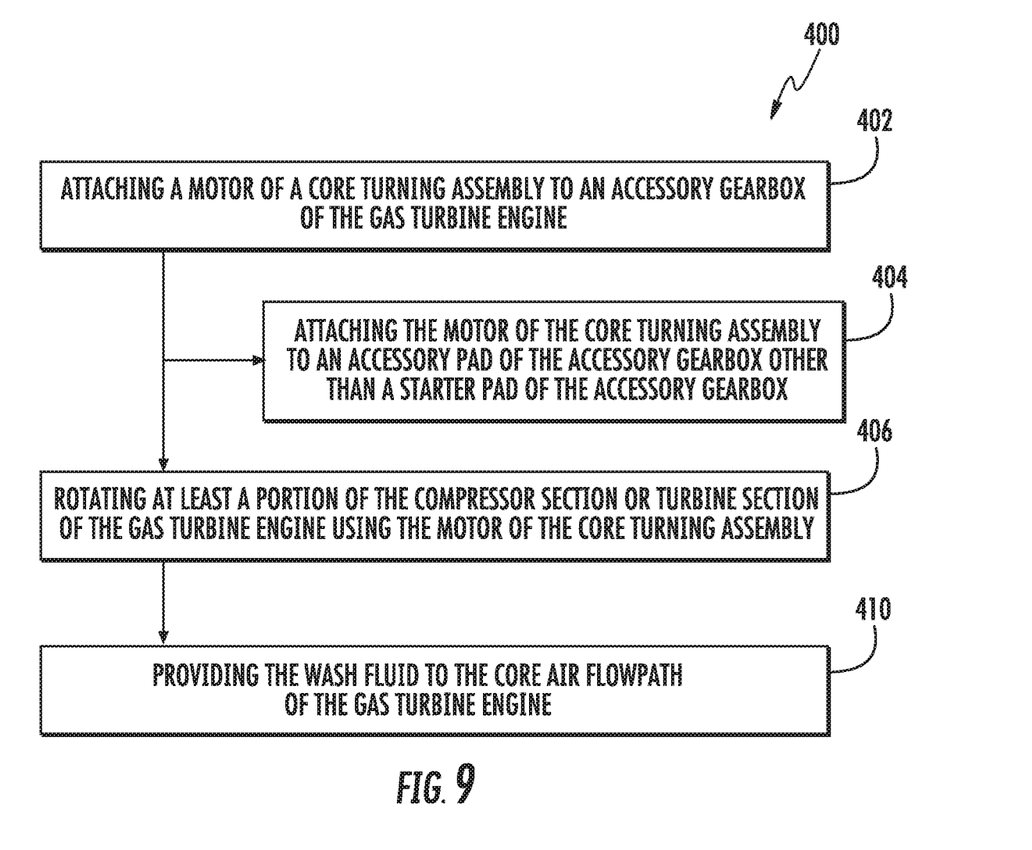
FIG. 9 is a flow diagram of a method for washing a gas turbine engine in accordance with another exemplary aspect of the present disclosure.

Further, the exemplary method 400 of FIG. 9 additionally includes at (410) providing the wash fluid to the core air flowpath of the gas turbine engine. As with the method 300 of FIG. 8, the wash fluid provided at (410) may be any suitable wash fluid, including, e.g., a reactive foam wash fluid.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wash system for a gas turbine aircraft engine comprising a compressor section, a turbine section, and an accessory gearbox, the wash system comprising:
   a core turning assembly comprising a motor mechanically coupled to the gas turbine aircraft engine for rotating one or more components of the compressor section or the turbine section at a rotational speed greater than two (2) revolutions per minute and less than five hundred (500) revolutions per minute during washing operations of the gas turbine aircraft engine, and
   a wash fluid line fluidly connected to a location within a core air flowpath of the gas turbine aircraft engine, the wash fluid line comprising one or more of a first wash fluid line oriented adjacent an inlet of the core air flowpath of the gas turbine aircraft engine and a second wash fluid line extending through an inspection hole of the gas turbine aircraft engine,
   wherein the motor is mechanically coupled to the accessory gearbox, wherein the accessory gearbox of the gas turbine aircraft engine comprises a plurality of gears;
   wherein the accessory gearbox further comprises a plurality of accessory pads that communicate with the plurality of gears and is configured to be coupled to an outer casing of the gas turbine aircraft engine;
   wherein the core turning assembly further comprises an offset tool and an adapter, the offset tool coupled to the motor and the adapter, the adapter being coupled to a selected one of the plurality of accessory pads, wherein the adapter is also coupled to a selected one of the plurality of gears other than a starter gear, wherein the selected one of the plurality of gears is coupled to a horizontal driveshaft, wherein the horizontal driveshaft is coupled to a transfer gearbox, wherein the transfer gearbox is coupled to a selected one of the one or more components;
   wherein the accessory gearbox is configured to drive multiple accessories of the gas turbine aircraft engine at least in part via the plurality of accessory pads when the gas turbine aircraft engine is operating.

2. The wash system of claim 1, wherein the motor is mechanically coupled to the horizontal driveshaft through a flexible coupling.

3. The wash system of claim 1, wherein the motor is a ten (10) horsepower motor or less.

4. The wash system of claim 1, wherein the wash fluid line is configured to be fluidly connected to a location within at least one of the compressor section or the turbine section of the gas turbine aircraft engine, the wash fluid line configured to provide a wash fluid to at least one of the compressor section or the turbine section during rotation of at least one of the compressor section or the turbine section by the motor.

5. A wash system for a gas turbine aircraft engine comprising a compressor section and a turbine section, the wash system comprising:
   an accessory gearbox attached to the gas turbine aircraft engine;
   a core turning assembly comprising a motor attached to the accessory gearbox and rotate one or more components of the compressor section or the turbine section at a rotational speed greater than two (2) revolutions per minute (RPM) and less than five hundred (500) RPM when the accessory gearbox is attached to the gas turbine aircraft engine and during washing operations of the gas turbine aircraft engine, and
   a wash fluid line fluidly connected to a location within a core air flowpath of the gas turbine aircraft engine, the wash fluid line comprising one or more of a first wash fluid line oriented adjacent an inlet of the core air flowpath of the gas turbine aircraft engine and a second wash fluid line extending through an inspection hole of the gas turbine aircraft engine,
   wherein the accessory gearbox comprises a plurality of gears;
   wherein the accessory gearbox comprises a plurality of accessory pads that communicate with the plurality of gears and is configured to be coupled to an outer casing of the gas turbine aircraft engine;
   wherein the core turning assembly comprises an offset tool and an adapter, the offset tool coupled to the motor and the adapter, the adapter being coupled to a selected one of the plurality of accessory pads, wherein the adapter is also coupled to a selected one of the plurality of gears other than a starter gear, wherein the selected one of the plurality of gears is coupled to a horizontal driveshaft, wherein the horizontal driveshaft is coupled to a transfer gearbox, wherein the transfer gearbox is coupled to a selected one of the one or more components;

wherein the accessory gearbox is configured to drive multiple accessories of the gas turbine aircraft engine at least in part via the plurality of accessory pads when the gas turbine aircraft engine is operating.

6. The wash system of claim 5, wherein the motor is configured to rotate the one or more components of at least one of the compressor section or the turbine section in a first circumferential direction and in a second circumferential direction, and wherein the second circumferential direction is opposite the first circumferential direction.

7. The wash system of claim 5, wherein the horizontal driveshaft is selectively disengaged from the starter gear and rotatable independently of the starter gear.

8. A method for washing a gas turbine aircraft engine comprising:
attaching a motor of a core turning assembly to an accessory gearbox of the gas turbine aircraft engine;
rotating at least a portion of a compressor section or a turbine section of the gas turbine aircraft engine including one or more components using the motor of the core turning assembly, wherein the accessory gearbox comprises a plurality of gears, wherein rotating at least a portion of the compressor section or the turbine section of the gas turbine aircraft engine comprises rotating a horizontal driveshaft, wherein rotating at least a portion of the compressor section or the turbine section of the gas turbine aircraft engine includes rotating at least a portion of the compressor section or the turbine section of the gas turbine aircraft engine using the motor of the core turning assembly at a rotational speed greater than two (2) revolutions per minute (RPM) and less than five hundred (500) RPM; and
providing a wash fluid to a core air flowpath of the gas turbine aircraft engine via a wash fluid line, wherein providing the wash fluid to the core air flowpath of the gas turbine aircraft engine via the wash fluid line includes providing one or more of a first portion of the wash fluid through an inlet of the core air flowpath of the gas turbine aircraft engine via a first wash fluid line and providing a second portion of the wash fluid through an inspection hole of the gas turbine aircraft engine via a second wash fluid line;
wherein the accessory gearbox comprises a plurality of accessory pads that communicate with the plurality of gears and is configured to be coupled to an outer casing of the gas turbine aircraft engine;
wherein the core turning assembly comprises an offset tool and an adapter, the offset tool coupled to the motor and the adapter, the adapter being coupled to a selected one of the plurality of accessory pads, wherein the adapter is also coupled to a selected one of the plurality of gears other than a starter gear, wherein the selected one of the plurality of gears is coupled to the horizontal driveshaft, wherein the horizontal driveshaft is coupled to a transfer gearbox, wherein the transfer gearbox is coupled to a selected one of the one or more components;

wherein the accessory gearbox is configured to drive multiple accessories of the gas turbine aircraft engine at least in part via the plurality of accessory pads when the gas turbine aircraft engine is operating.

9. The method of claim 8, wherein attaching the motor of the core turning assembly to the accessory gearbox of the gas turbine aircraft engine further comprises removing a starter motor of the gas turbine aircraft engine from the accessory gearbox of the gas turbine aircraft engine.

10. The method of claim 8, wherein providing the wash fluid to the core air flowpath of the gas turbine aircraft engine comprises injecting a foam detergent through one or more inspection ports of the gas turbine aircraft engine to the core air flowpath of the gas turbine aircraft engine.

11. The method of claim 8, wherein rotating the horizontal driveshaft comprises rotating the horizontal driveshaft independently of a plurality of gears of the accessory gearbox.

12. The method of claim 8, wherein rotating at least a portion of a compressor section or a turbine section of the gas turbine aircraft engine using the motor of the core turning assembly comprises rotating an accessory gear of the accessory gearbox using the motor of the core turning assembly.

13. The method of claim 8, wherein rotating at least a portion of the compressor section or the turbine section of the gas turbine aircraft engine using the motor of the core turning assembly comprises rotating at least a portion of the compressor section or the turbine section in a first circumferential direction using the motor of the core turning assembly and subsequently rotating at least a portion of the compressor section or the turbine section in a second circumferential direction using the motor of the core turning assembly.

14. The wash system of claim 5, wherein the wash fluid line is configured to be fluidly connected to a location within at least one of the compressor section or the turbine section of the gas turbine aircraft engine, the wash fluid line configured to provide a wash fluid to at least one of the compressor section or the turbine section during rotation of at least one of the compressor section or the turbine section by the motor.

* * * * *